(12) United States Patent
Bartley et al.

(10) Patent No.: US 8,172,140 B2
(45) Date of Patent: May 8, 2012

(54) DOPED IMPLANT MONITORING FOR MICROCHIP TAMPER DETECTION

(75) Inventors: Gerald K Bartley, Rochester, MN (US); Darryl J. Becker, Rochester, MN (US); Todd A. Christensen, Rochester, MN (US); Paul E. Dahlen, Rochester, MN (US); Philip R. Germann, Oronoco, MN (US); Andrew B. Maki, Rochester, MN (US); Mark O. Maxson, Mantorville, MN (US); John E. Sheets, II, Zumbrota, MN (US)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 12/181,401

(22) Filed: Jul. 29, 2008

(65) Prior Publication Data
US 2010/0025479 A1 Feb. 4, 2010

(51) Int. Cl.
*G06K 7/08* (2006.01)
(52) U.S. Cl. .................. 235/451; 235/492; 340/550
(58) Field of Classification Search .......... 340/550; 235/451, 492
See application file for complete search history.

(56) References Cited

U.S. PATENT DOCUMENTS

| | | | |
|---|---|---|---|
| 4,146,752 A | 3/1979 | Konig | |
| 4,288,829 A | 9/1981 | Tango | |
| 5,117,457 A | 5/1992 | Comerford et al. | |
| 5,177,352 A | 1/1993 | Carson et al. | |
| 5,389,738 A | 2/1995 | Piosenka et al. | |
| 5,675,319 A | 10/1997 | Rivenberg et al. | |
| 5,790,670 A | 8/1998 | Bramlett | |
| 5,861,652 A | 1/1999 | Cole et al. | |
| 5,889,306 A | 3/1999 | Christensen et al. | |
| 6,121,659 A | 9/2000 | Christensen et al. | |
| 6,264,108 B1 | 7/2001 | Baentsch | |
| 6,396,400 B1 | 5/2002 | Epstein, III et al. | |
| 7,005,733 B2 | 2/2006 | Kommerling et al. | |
| 7,362,248 B2 | 4/2008 | McClure et al. | |
| 7,555,787 B2 | 6/2009 | Clercq | |
| 2001/0033012 A1 | 10/2001 | Kommerling et al. | |
| 2002/0007459 A1 | 1/2002 | Cassista et al. | |
| 2002/0199111 A1 | 12/2002 | Clark et al. | |
| 2005/0151777 A1 | 7/2005 | Silverbrook | |
| 2005/0218401 A1 | 10/2005 | Marinet et al. | |
| 2005/0274630 A1 | 12/2005 | Clark et al. | |
| 2005/0275538 A1 | 12/2005 | Kulpa | |
| 2006/0028340 A1* | 2/2006 | Hooghan et al. | 340/561 |
| 2006/0081497 A1 | 4/2006 | Knudsen | |
| 2006/0157803 A1 | 7/2006 | Chow et al. | |
| 2007/0029384 A1 | 2/2007 | Atherton | |
| 2008/0000988 A1 | 1/2008 | Farooq et al. | |
| 2008/0258754 A1 | 10/2008 | Dillon et al. | |

(Continued)

OTHER PUBLICATIONS

U.S. Appl. No. 12/181,342, Notice of Allowance dated Jan. 26, 2011, (12 pgs).

(Continued)

*Primary Examiner* — Kristy A Haupt
(74) *Attorney, Agent, or Firm* — Toler Law Group (57) ABSTRACT

A method and apparatus include conductive material doped within a microchip that accumulates a detectable charge in the presence of ions. Such ions may result from a focused ion beam or other unwelcome technology exploitation effort. Circuitry sensing the charge buildup in the embedded, doped material may initiate a defensive action intended to defeat the tampering operation.

20 Claims, 4 Drawing Sheets

U.S. PATENT DOCUMENTS

| | | |
|---|---|---|
| 2008/0260150 A1 | 10/2008 | De Clercq |
| 2009/0146270 A1 | 6/2009 | Buer et al. |
| 2010/0026313 A1 | 2/2010 | Bartley et al. |
| 2010/0026506 A1 | 2/2010 | Bartley et al. |
| 2010/0031064 A1 | 2/2010 | Walmsley |
| 2010/0090714 A1 | 4/2010 | Van Geloven et al. |

OTHER PUBLICATIONS

Berrie, The Practical Engineer—The defensive design of printed-circuit boards, Sep. 1999, IEEE Spectrum, vol. 36, Issue 9, (pp. 76-81).

U.S. Appl. No. 12/181,387, Non-Final Office Action dated Feb. 28, 2011, (9 pgs).

Chinchani et al., A Tamper-Resistant Framework for Unambiguous Detection of Attacks in User Space Using Process Monitors, 2003, IEEE, (10 pgs).

U.S. Appl. No. 12/181,357, Non-Final Office Action dated Jan. 20, 2011, (11 pgs).

U.S. Appl. No. 12/181,357, Final Office Action dated Jul. 1, 2011, (9 pgs).

U.S. Appl. No. 12/181,387, Final Office Action dated Aug. 15, 2011, (10 pgs).

* cited by examiner

DOPED IMPLANT MONITORING FOR MICROCHIP TAMPER DETECTION

RELATED APPLICATIONS

The present application relates to co-pending U.S. patent applications entitled "Capacitance-Based Microchip Exploitation Detection" (Ser. No. 12/181,342), "Signal Quality Monitoring to Defeat Microchip Exploitation" (Ser. No. 12/181,352), "False Connection for Defeating Microchip Exploitation" (Ser. No. 12/181,367), "Interdependent Microchip Functionality for Defeating Exploitation Attempts" (Ser. No. 12/181,376), "Capacitance Structures for Defeating Microchip Tampering" (Ser. No. 12/181,365), "Resistance Sensing for Defeating Microchip Exploitation" (Ser. No. 12/181,387), and "Continuity Check Monitoring for Microchip Exploitation Detection" (Ser. No. 12/181,357), all of which are filed concurrently herewith and which are incorporated by reference in their entireties.

FIELD OF THE INVENTION

The present invention relates generally to microchip technologies, and more particularly, to protecting the circuitry and content of microchips.

BACKGROUND OF THE INVENTION

Protecting microchip technology deployed in the field is an enormous concern in both military and commercial sectors. Microchips and related devices are routinely acquired by motivated competitors and governments seeking to reverse engineer or otherwise learn the functionality of the technology. Such information is used to make a technological leap in their own devices, or may be used to exploit a perceived weakness in the examined equipment. Sophisticated government and commercial entities thus possess ample strategic and economic motivation to reverse engineer microchip components.

A microchip, or integrated circuit, is a unit of packaged computer circuitry that is manufactured from a material, such as silicon, at a very small scale. Microchips are made for program logic (logic or microprocessors) and for computer memory (Random Access Memory or other memory microchips). Microchips are also made that include both logic and memory, and for special purposes, such as signal, graphics and other processing applications.

An advanced method of reverse engineering select microchip components uses high energy photons, electrons or ions. Focused ion beam processes excite active portions of a microchip to observe how other portions are affected. When used to reverse engineer, these processes are typically done while the microchip is in a powered-on state in order to observe the functionality of the microchip.

Microchip designers in the aerospace, defense and commercial industries routinely implement software and other logic-related techniques to confuse and thwart attempts to probe the active side of the component. For example, safeguard measures integrated within microchips hinder reverse engineering techniques. Microchip designers capitalize on the powered on status required by a reverse engineering process to incorporate a self-destruct or obstructing mechanism into the microchip. The mechanism is triggered by the detection of tampering. When tampering is detected, the power in the circuit is diverted to microchip annihilation or another predetermined measure.

Microchip designers occasionally impede the reverse engineering processes by additionally plating the back of the bulk silicon with a metal layer. While intact, this layer obstructs both the insertion of ions and electrons, and the observation of photons.

While these safeguards provide some protection, motivated exploiters have developed ingenious ways of analyzing the microchip without triggering the safeguard mechanisms. Despite the precautions, the backside of the microchip remains vulnerable to inspection by photons, focused ion beam, or even simple infrared observation. Sophisticated exploitation techniques overcome conventional obstacles by removing the bulk silicon and metallized back layer. For instance, reverse engineering processes may grind away the metallized portion towards implementing a successful focused ion beam operation. In this manner, microchip information may be exploited in a manner that does not initialize a self-destruct feature.

Consequently what is needed is an improved manner of detecting tampering of a microchip.

SUMMARY OF THE INVENTION

The present invention provides an improved method, apparatus and program product for protecting security sensitive circuitry of a microchip from undesired analysis by providing, in part, an embedded material residing within a microchip that includes security sensitive circuitry, wherein a charge accumulates in the embedded material as a result of ion bombardment associated with an effort to reverse engineer the security sensitive circuitry. Aspects of the invention may further include circuitry configured to initiate an action for obstructing the reverse engineering effort of the security sensitive circuitry in response to the accumulated charge.

The circuitry may further be configured to detect the accumulated charge. For instance, the circuitry may be further configured to determine that the accumulated charge exceeds a preset voltage level. To this end, the circuitry may include a comparator.

According to an aspect of the invention, the embedded material may comprise silicon, including doped $n^+$ silicon. The embedded material may reside proximate the security sensitive circuitry of the microchip. The embedded material may reside below an oxide layer of the microchip.

Another or the same embodiment may include other embedded material residing within the microchip. The embedded material and the other embedded material may be coplanar. In another embodiment consistent with the invention, the embedded material and the other embedded material may overlap.

Another aspect of the invention regards a connection between the embedded material and the circuitry. The connection may comprise a deep trench connection. Alternatively, the connection may comprise a through-silicon via. An embodiment may include program code executed by the circuitry and configured to initiate the action for obstructing analysis of the security sensitive circuitry in response to the accumulated charge, as well as a machine/computer readable medium bearing the program code. The action may include a shutdown, a spoofing and/or a self-destruct operation.

According to another aspect of the invention, a plurality of embedded material shapes reside within a microchip that includes security sensitive circuitry. Respective charges may accumulate in the plurality of embedded material shapes as a result of ion bombardment association with an effort to reverse engineer the security sensitive circuitry. Circuitry may be configured to initiate an action for obstructing the reverse engineering effort of the security sensitive circuitry in response to a sum of the accumulated charges.

An embodiment consistent with the principles of the present invention includes a method of protecting security sensitive circuitry of a microchip from undesired analysis by, in part, sensing an accumulated charge in an embedded material residing within a microchip that includes security sensitive circuitry. A charge may accumulate in the embedded material as a result of ion bombardment associated with the undesired analysis of the security sensitive circuitry. An action may be initiated to obstruct the undesired analysis of the security sensitive circuitry in response to sensing the accumulated charge. The action may include a shutdown, a spoofing and/or a self-destruct operation. Aspects of the invention may determine if the accumulated charge exceeds a preset voltage.

These and other advantages and features that characterize the invention are set forth in the claims annexed hereto and forming a further part hereof. However, for a better understanding of the invention, and of the advantages and objectives attained through its use, reference should be made to the Drawings and to the accompanying descriptive matter in which there are described exemplary embodiments of the invention.

DETAILED DESCRIPTION

Embodiments consistent with the underlying principles of the present invention include conductive material doped within a microchip that accumulates a detectable charge in the presence of ions. Such ions may result from a focused ion beam or other unwelcome technology exploitation effort. Circuitry sensing the charge buildup in the embedded material may initiate a defensive action intended to defeat the tampering operation.

Aspects of the invention may detect the presence of an incident focused ion beam on the semiconductor and quickly terminating all the functional activity. The microchip may include for this purpose a buried layer of conductive silicon (e.g., an n-doped implant). The silicon may comprise an appropriate geometric structure to detect incident current. The embedded material comprising the silicon may advantageously be positioned strategically over critical on-chip circuitry or as camouflage over other areas.

In one embodiment consistent with the invention, the buried silicon is connected to active circuitry capable of discerning a charge buildup consistent with a focused ion beam attempt. The embedded material may be connected to the active circuitry with deep-trench-like connections, or using through-silicon or other vias.

Attempts to use high energy particles to debug and/or analyze the die may result in free charge generation and subsequent charge buildup on the buried, conductive layer comprising the embedded material. As this charge accumulates, it may modify the performance and the functionality of the die under high energy evaluation.

During a focused ion beam process, single-charged gallium ions are typically accelerated through a few tens of thousands of volts and directed toward the target semiconductor. The product is subjected to fairly high fluxes of incident ions (tens of nano-amperes or charge density). At a typical acceleration of 20 kV, the gallium ions are accelerated to a velocity of around 2.8E5 m/second. Each atom's mass is approximately 1.2E-25 kg (70 amu), so the incident kinetic energy of a single ion is on the order of 4.7E-15 joules (around 30 keV). Embodiments consistent with the invention may detect the incident energy, as well as the termination of product function resulting from the focused ion beam process.

In one sense, aspects of the invention capitalize on known doping processes of embedding an doped $n^+$ doped implanted layer below the active layer in a microchip. For example, doped $n^+$ doped implant shapes may be embedded below the oxide. The embedded material may be connected to circuitry capable of detecting the charge buildup that will occur during the focused ion beam process.

In one embodiment, a plate of embedded material shields and is used as a detector for the focused ion beam. Some embodiments consistent with the invention may include multiple plates. In one embodiment, parallel plates are formed either side-by-side, or at different depths within the chip, allowing a direct comparison of the voltage on one plate to the other.

As discussed herein, the embedded material in the buried layer may be connected to active circuitry by using deep trench-like connections or vias. Deep trench connection may be hidden from the view of an observer.

A focused ion beam may impart its current onto the conductor and into the sense circuitry. A comparison circuit may be used to detect the presence of current in the embedded material. The connections to the embedded material may be multiplexed together into a comparator. The comparator may act as a current sensor. When a signal is detected at the input of the comparator, an output signal may be sent to the critical circuits on the microchip to shut them down or initiate another defensive action. Other such actions may regard deceptive/spoofing or self-destruct operations.

Figure 1:
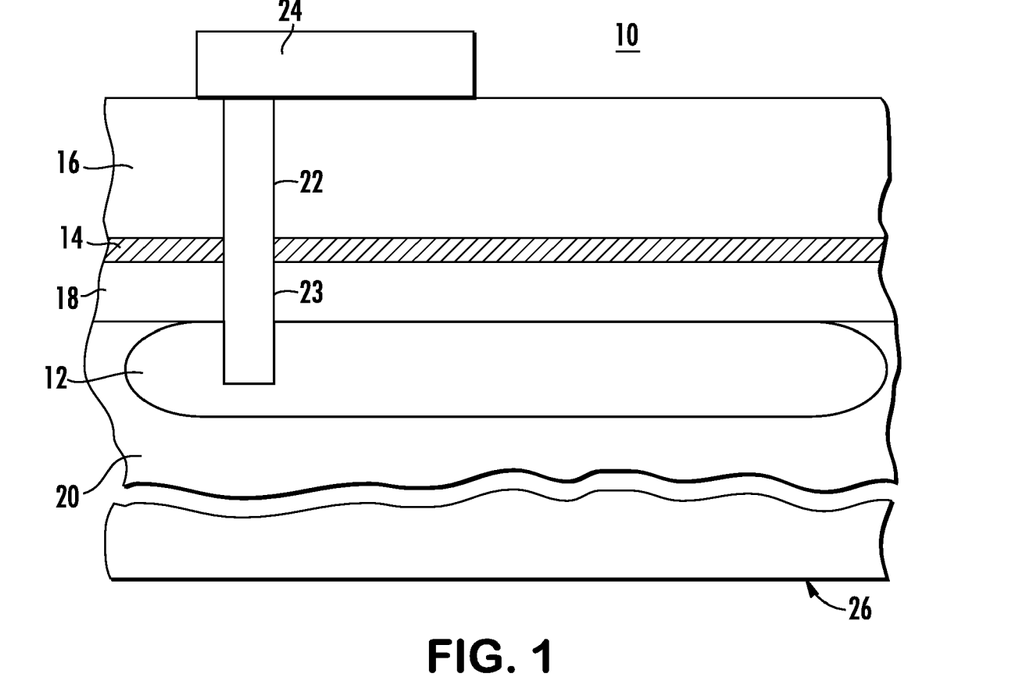
FIG. 1 shows a cross-sectional perspective of an integrated circuit having doped implant material configured to sense ions from a focused ion beam tool and to generate a signal initiating a defensive measure in response to the ions in accordance with the underlying principles of the present invention.

FIG. 1 shows a cross-sectional perspective of a microchip/integrated circuit assembly 10 having doped implant material 12 configured to sense ions from a focused ion beam tool and to generate a signal initiating a defensive measure in response to the ions. The integrated circuit assembly 10 includes security sensitive transistors and other circuitry in an active layer 14. An insulating oxide 16 may bound the active area 14 on one side, and buried oxide 8, 18 may be present on the other side of the active area 14. The doped implant material 12 may be n+ type doped implant material. The n-doped implant material 12 is generally situated close enough to the active area 14 such that an attempt to exploit the active area 14 will also be sensed by the doped implant material 12.

The n+ type doped implant material 12 may be bounded on another side by p-doped bulk material 20. A connection 22 may connect the active circuitry 14 to a metal layer 24, though the connection 22 may not directly contact the active circuitry 14 in one embodiment. The connection 22 may comprise a stud, via, or other wiring. A through-silicon via is a type of via that generally comprises a vertical electrical connection passing through a silicon wafer or die for the purpose of creating three-dimensional packages and circuits. The metal layer 24 may include copper or other metal wiring capable of connecting the active area 14 to another device (not shown). The same or a different connection 23 in FIG. 1 may connect the embedded material 12 to the active circuitry 14.

The n+ type doped implant embedded material 12 may be embedded below the oxide layers 16, 18. The embedded material 12 may be connected to defensive circuitry (not shown). During a focused ion beam process, charge may build up within the embedded material 12. The charge may be sensed by the defensive circuitry.

FIG. 1 also shows a backside layer 26 that may comprise a copper shield or other material physically protecting the integrated circuit assembly 10 from exploitation. As the backside layer 26 is ground down during an exploitation attempt, an increase in ions from the focused ion beam process will be sensed in the doped implant material 12.

In semiconductor production, doping generally refers to the process of intentionally introducing impurities into an extremely pure (also referred to as intrinsic) semiconductor in order to change its electrical properties. Some dopants are generally added as a silicon boule is grown, giving each wafer an almost uniform initial doping. To define circuit elements and other embedded materials, selected areas may be further doped by such processes as diffusion, photolithography and ion implantation, among other processes.

The number of dopant atoms needed to create a difference in the ability of a semiconductor to conduct is very small. Where a comparatively small number of dopant atoms are added, e.g., on the order of 1 in every 100,000,000 atoms, then the doping is said to be low, or light. Where many more are added, e.g., on the order of 1 in every 10,000, then the doping is referred to as heavy, or high. This is often shown as n+ for n-type dopant, or p+ for p-type doping.

P-type semiconductor doping generally adds atoms to the semiconductor in order to increase the number of free (and positive) charge carriers. When the doping material is added, it takes away (accepts) weakly bound outer electrons from the semiconductor atoms. This type of doping agent is also known as acceptor material, and the semiconductor atoms that have lost an electron are known as holes.

In this manner, p-type doping generally creates an abundance of holes. In the case of silicon, a trivalent atom (typically from group IIIA of the periodic table, such as boron or aluminum) may be substituted into the crystal lattice. The result is that one electron is missing from one of the four covalent bonds normal for the silicon lattice. The dopant atom can accept an electron from a neighboring atoms' covalent bond to complete the fourth bond. Such dopants are called acceptors. The dopant atom accepts an electron, causing the loss of half of one bond from the neighboring atom and resulting in the formation of a hole. Each hole is associated with a nearby negative-charged dopant ion, and the semiconductor remains electrically neutral as a whole. However, once each hole has wandered away into the lattice, one proton in the atom at the hole's location will be exposed and no longer cancelled by an electron. For this reason a hole behaves as a quantity of positive charge. When a sufficiently large number of acceptor atoms are added, the holes greatly outnumber the thermally-excited electrons. Thus, the holes are the majority carriers, while electrons are the minority carriers in p-type materials.

An n-type semiconductor is generally achieved by carrying out a process of doping that adds an impurity of valence-five elements to a valence-four semiconductor in order to increase the number of free (and negative) charge carriers. In this manner, n-type doping may produce an abundance of mobile or "carrier" electrons in the material. For purposes of this specification, embedded material may refer to any doped, implanted, buried or other material positioned within the microchip.

Figure 2:
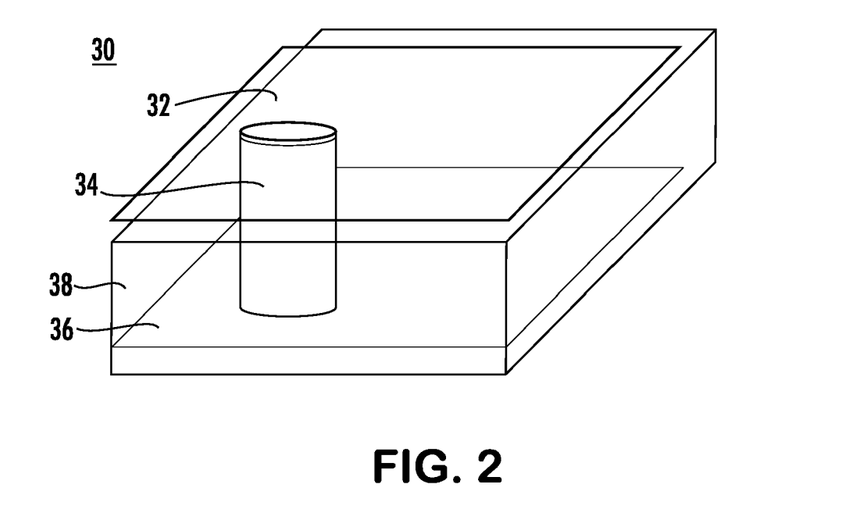
FIG. 2 shows a perspective view of a portion of an integrated circuit assembly having sensing circuitry comprising embedded material connected to the active layer by a connection in accordance with the underlying principles of the present invention.

FIG. 2 shows a perspective view of a portion of an integrated circuit assembly 30 having sensing circuitry comprising embedded material 32 connected to the active layer 36 by a connection 34. As shown in FIG. 2, the connection 34 and active layer 36 may be embedded in an oxide layer 38. Where desired, the connection 34 may include a deep trench connection that remains hidden from view.

While one wire, layer or other shape of embedded material may be used in an embodiment consistent with the underlying principals of the present invention, other embodiments may use multiple such shapes. Some such shapes may be formed side-by-side, at different depths within a microchip, or in an overlapping relationship, among other configurations. The relative proximity and arrangement of such embedded material may allow for further comparison of voltages as between the embedded material.

Figure 3:
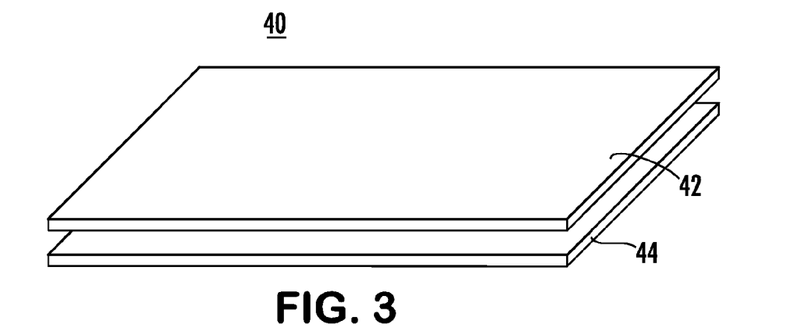
FIG. 3 shows an arrangement of two doped implant materials arranged in a stacked configuration in accordance with the underlying principles of the present invention.

FIG. 3 shows an arrangement 40 of two doped implant materials 42, 44 arranged in a stacked configuration. Ions generated during a focused ion beam process may impart different concentrations of ions onto each respective shape 42, 44. The doped implant embedded materials 42, 44 may be surrounded by p-bulk or other material, and may be implanted under the oxide areas of a microchip.

Figure 4:
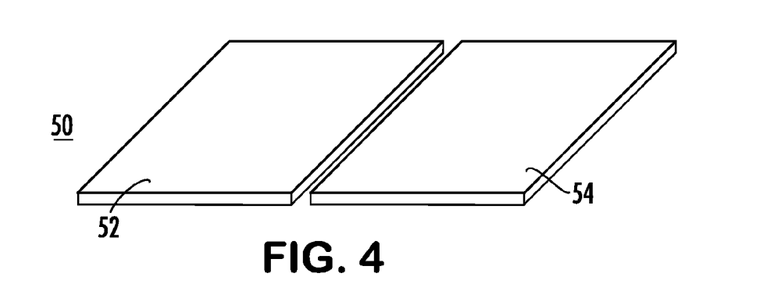
FIG. 4 shows a side-by-side arrangement of doped embedded material in accordance with the underlying principles of the present invention.

FIG. 4 shows a side-by-side arrangement 50 of doped embedded material 52, 54. As such, embedded material shapes consistent with the invention may be discontinuous.

Figure 5:
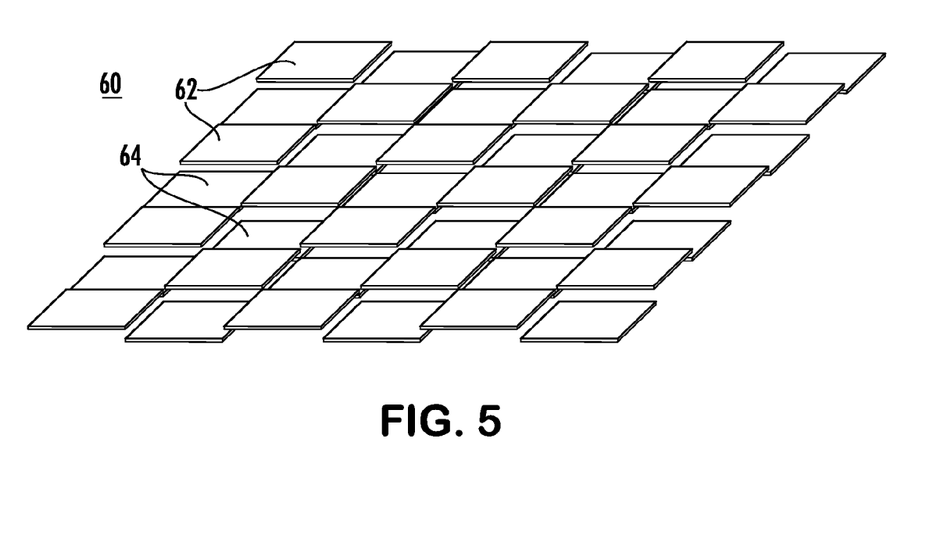
FIG. 5 shows an assembly of doped implant material as shown in an asymmetric view that shows that the implant material may be positioned at different levels in accordance with the underlying principles of the present invention.

FIG. 5 shows an assembly 60 of doped implant material 62, 64 as shown in an asymmetric view that shows the implant material 62, 64 may be positioned at different levels.

Figure 6:
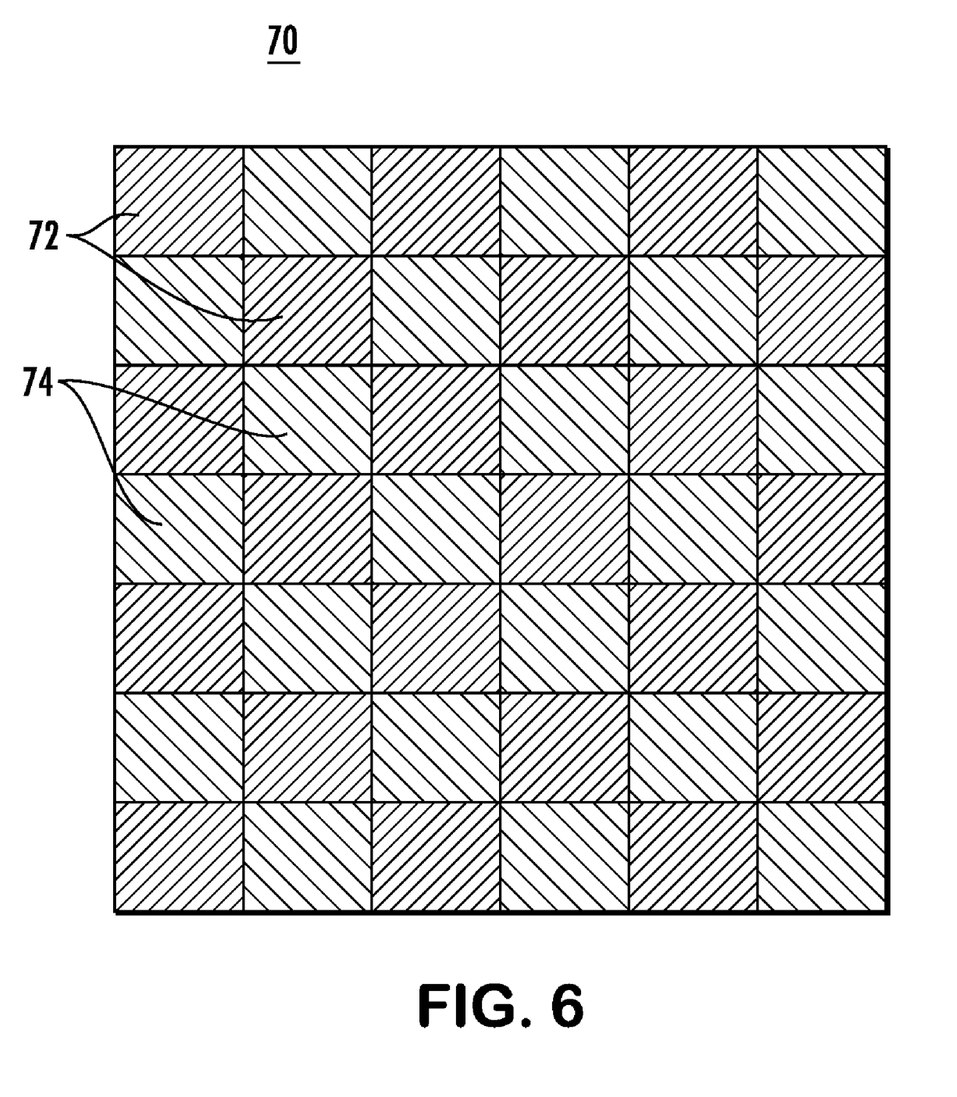
FIG. 6 shows an arrangement of doped implant material similar to the arrangement shown in FIG. 5, but taken from a top view.

FIG. 6 shows an arrangement 70 of doped implant material 72, 74 similar to the arrangement shown in FIG. 5, but taken from a top view. As shown in FIG. 6, material 72, 74 may appear as a solid structure to an observer conducting a reverse engineering effort.

Figure 7:
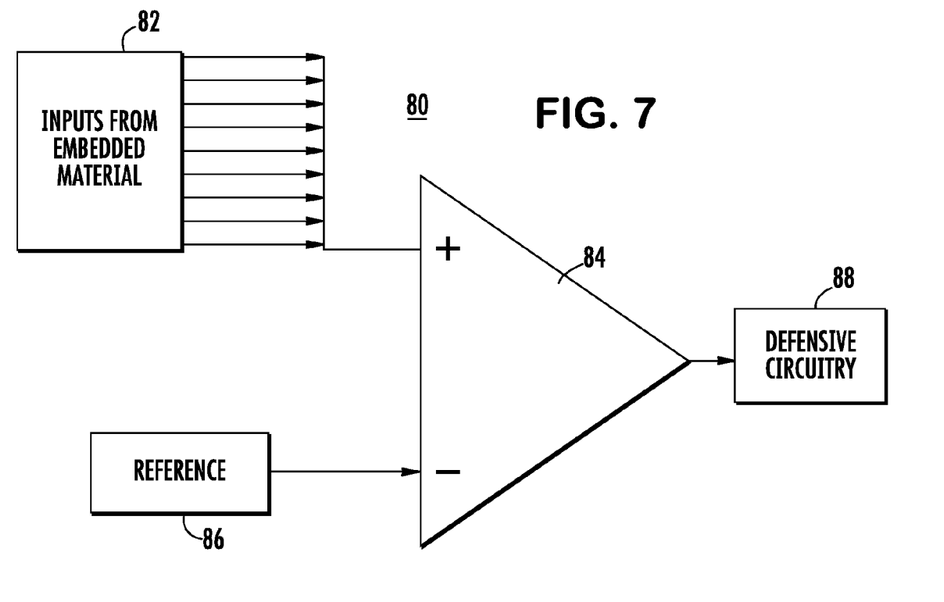
FIG. 7 shows a detection and defensive circuit that may be used to determine the presence of a reverse engineering attempt and that may be configured to initiate a defensive action for a microchip such as is shown in FIG. 1.

FIG. 7 shows a detection and defensive circuit 80 that may be used to determine the presence of a reverse engineering attempt and that may be configured to initiate a defensive action for a microchip such as is shown in FIG. 1. The circuit 80 includes inputs 82 from embedded material 72, 74. The inputs 82 may be transferred to a positive input of a comparator 84. The minus input of the comparator 84 may receive a signal from a reference voltage 86. Inputs 82 from the embedded material 72, 74 may increase in response to a process that bombards the embedded material 72, 74 with ions. As the voltage increases at the positive terminal of the comparator 84, the voltage may reach a level that exceeds the reference voltage 86 at the minus prong of the comparator 84. At such a point, the exemplary circuit may output a signal to defensive circuitry 88. The defensive circuitry 88 may initiate an action that is not limited to a spoofing operation, a shutdown procedure, or a self-destruct action.

Figure 8:
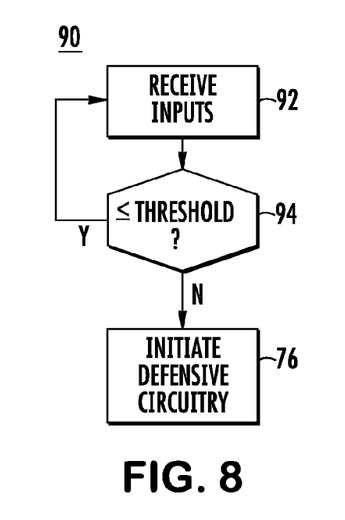
FIG. 8 is a flowchart having steps executable by circuitry of an integrated circuit such as is shown in FIG. 1 for sensing ions associated with a focused ion beam tool and for initiating a defensive measure in response to the ions in accordance with the underlying principles of the present invention.

FIG. 8 is a flowchart 90 having steps executable by circuitry 80 of an integrated circuit 10 such as is shown in FIG. 1. The detection circuitry may receive at block 92 inputs 82 from embedded material 12. The magnitude or other electrical quality of the input signals 82 may be compared at block 94 to some threshold value. Should the magnitude of the received inputs 82 be less than the threshold value at block 94, then the circuit 80 may continue to monitor inputs 82 at block 92. Such monitoring may be passive in some embodiments.

Where the magnitude of the received inputs 82 is alternatively greater than the threshold value at block 94, then the circuitry 80 may initiate at block 76 a defensive action. Such defensive actions are not limited to those intended to obscure the exploitation attempt. For instance, exemplary actions may include self destruct, shutdown and spoofing/deceptive operations.

Embodiments are unlikely to register normally occurring alpha particles as an exploitation attempt. Alpha particles are discrete events, and have a substantially smaller charge than those involved in a focused ion beam process. As such, there is insufficient current provided for the detector to sense. The focused ion beam will generally impart significantly more current than an alpha particle. Alpha particles cannot generally penetrate far enough into the chip to hit incident on the implant.

Gamma rays have enough energy to ionize the atoms in the embedded material. However, the probability of interaction is very low for perpendicular incidence because the implant layer is so thin. Should a gamma ray be incident from the side of the chip, then its probability of absorption is greater. This may cause significant ionization currents. For example, if all the energy from a 10 MeV gamma ray is transferred to ionization in the implant region, then a rough order of magnitude for freed electrons by Compton scattering may be in the range of one million. Such current is roughly five orders of magnitude less than the focused ion beam, and occurs for a brief period of time. Furthermore, ionization current from gamma rays result in positive current flow (more free electrons), while the incident FIB beam results in negative current flow (positive ions impacting the implant material). Embodiments consistent with the invention may include a detection circuit that filters the input signal from the detector either in the time domain by requiring a sustained current for a period of time, or by sensing only negative current flow.

Electrostatic discharge (ESD) is the sudden and momentary electric current that flows between two objects at different electrical potentials. ESD events may cause significant current flow in the detector. Embodiments may include a detection circuit that uses a comparison to a reference plate. The reference plate may include a separate implanted plate, or another reference in the microchip or assembly. In an ESD event, the reference plate may move in the common mode with the detector, resulting in no differential signal. The detection circuit may also be designed to window out an ESD event in time, similar to a gamma ray event.

While the invention has and hereinafter will be described in the context of integrated circuit assemblies, those skilled in the art will appreciate that the various embodiments of the invention are capable of being distributed as a program product in a variety of forms, and that the invention applies equally regardless of the particular type of machine/computer readable, signal bearing media used to actually carry out the distribution. For instance, a separate processor incorporated within or otherwise in communication with an integrated circuit assembly may access memory to execute program code functions to identify tampering in a software manner that is consistent with the underlying principles of the present invention. Examples of signal bearing, machine/computer readable media include, but are not limited to tangible, recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In general, the routines executed to implement the embodiments of the invention, whether implemented in hardware, as part of an integrated circuit assembly, or as a specific application, component, program, engine, process, programmatic tool, object, module or sequence of instructions, or even a subset thereof, may be referred to herein as an "algorithm," "function," "program code," or simply "program." Program code typically comprises one or more instructions that are resident at various times in various memory and storage devices in a computing system. When read and executed by one or more processors, the program code performs the steps necessary to execute steps or elements embodying the various aspects of the invention. One of skill in the art should appreciate that embodiments consistent with the principles of the present invention may nonetheless use program code resident at only one, or any number of locations.

Those skilled in the art will further recognize that the exemplary environments illustrated in FIGS. 1-8 are not intended to limit the present invention. For instance, while flip chip mounting processes are used in many of the embodiments above for exemplary purposes, embodiments of the invention may have equal applicability to microchip assemblies associated with virtually any other mounting technique. Indeed, those skilled in the art will recognize that other alternative hardware and/or software environments may be used without departing from the scope of the invention.

Moreover, while the present invention has been illustrated by a description of various embodiments and while these embodiments have been described in considerable detail, it is not the intention of the Applicants to restrict, or in any way limit the scope of the appended claims to such detail. For instance, a specific embodiment may use a thin-oxide capacitor in a divider network as the buried (doped) element. Another embodiment may use two adjacent buried elements. A differential voltage between the two would indicate an exploration attempt. The invention in its broader aspects is therefore not limited to the specific details, representative apparatus and method, and illustrative example shown and described. Accordingly, departures may be made from such details without departing from the spirit or scope of Applicants' general inventive concept.

What is claimed is:

1. An apparatus comprising:
    an embedded material residing within a microchip that includes security sensitive circuitry, wherein a charge accumulates in the embedded material as a result of ion bombardment associated with an effort to reverse engineer the security sensitive circuitry;
    circuitry configured to initiate an action for obstructing the reverse engineering effort of the security sensitive circuitry in response to sensing the accumulated charge; and a connection between the embedded material and the circuitry, wherein the connection includes at least one of a deep trench connection and a through-silicon via connection.

2. The apparatus of claim 1, wherein the circuitry is further configured to detect the accumulated charge.

3. The apparatus of claim 1, wherein the circuitry is further configured to determine that the accumulated charge exceeds a preset voltage level.

4. The apparatus of claim 1, wherein the circuitry includes a comparator.

5. The apparatus of claim 1, wherein the embedded material comprises silicon.

6. The apparatus of claim 1, wherein the embedded material comprises doped n+ silicon.

7. The apparatus of claim 1, wherein the embedded material resides proximate the security sensitive circuitry of the microchip.

8. The apparatus of claim 1, wherein the embedded material resides below an oxide layer of the microchip.

9. The apparatus of claim 1 further comprising other embedded material residing within the microchip.

10. The apparatus of claim 9, wherein the embedded material and the other embedded material are coplanar.

11. The apparatus of claim 9, wherein the embedded material and the other embedded material overlap.

12. The apparatus of claim 1, further comprising program code executed by the circuitry and configured to initiate the action for obstructing analysis of the security sensitive circuitry in response to the accumulated charge; and a computer readable medium bearing the program code.

13. The apparatus of claim 1, wherein the action includes an operation selected from a group consisting of at least one of: a shutdown, a spoofing and a self-destruct operation.

14. An apparatus comprising:
a plurality of embedded material shapes residing within a microchip that includes security sensitive circuitry, wherein respective charges accumulate in the plurality of embedded material shapes as a result of ion bombardment associated with an effort to reverse engineer the security sensitive circuitry;

circuitry configured to initiate an action for obstructing the reverse engineering effort of the security sensitive circuitry in response to sensing a sum of the accumulated charges; and a connection between the plurality of embedded material shapes and the circuitry, wherein the connection includes at least one of a deep trench connection and a through-silicon via connection.

15. A method of protecting security sensitive circuitry of a microchip from undesired analysis, the method comprising:
sensing an accumulated charge in an embedded material residing within a microchip that includes security sensitive circuitry, wherein the microchip further includes a connection between the embedded material and the security sensitive circuitry, wherein the connection includes at least one of a deep trench connection and a through-silicon via connection, wherein a charge accumulates in the embedded material as a result of ion bombardment associated with the undesired analysis of the security sensitive circuitry; and initiating an action configured to obstruct the undesired analysis of the security sensitive circuitry in response to sensing the accumulated charge.

16. The method of claim 15, wherein initiating the action further comprises initiating an operation selected from a group consisting of at least one of: a shutdown, a spoofing and a self-destruct operation.

17. The method of claim 15, wherein initiating the action further comprises determining if the accumulated charge exceeds a preset voltage.

18. The method of claim 15, further comprising positioning the embedded material to be substantially co-planar with other embedded material.

19. The method of claim 15, further comprising positioning the embedded material to overlap other embedded material.

20. The method of claim 15, further comprising positioning the embedded material below an oxide layer of the microchip.

* * * * *